United States Patent [19]

Hergenrother et al.

[11] 4,225,697
[45] Sep. 30, 1980

[54] POLYPHOSPHAZENE POLYMERS CONTAINING DIALKYL ALKYLENE DIAMINO SUBSTITUENTS

[75] Inventors: William L. Hergenrother, Akron; Adel F. Halasa, Bath, both of Ohio

[73] Assignee: The Firestone Tire & Rubber Company, Akron, Ohio

[21] Appl. No.: 957,397

[22] Filed: Nov. 3, 1978

[51] Int. Cl.³ .................. C08G 79/02; C08G 73/00
[52] U.S. Cl. .................................... 528/168; 528/374; 528/399
[58] Field of Search ..................... 528/399, 168

[56] References Cited

U.S. PATENT DOCUMENTS

| 3,344,087 | 9/1967 | Becke et al. ............... 528/399 |
| 4,018,822 | 4/1977 | Sharma et al. ............. 260/551 P |

OTHER PUBLICATIONS

Allcock et al., Phosphonitrilic Compounds XV *Inorganic Chemistry* vol. 11, No. 11, 1972, pp. 2584–2590.

*Primary Examiner*—Wilbert J. Briggs, Sr.

[57] ABSTRACT

Polyphosphazene polymers are prepared which contain units represented by the formulas:

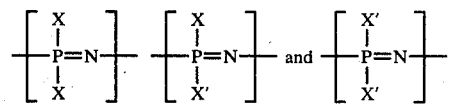

wherein X is

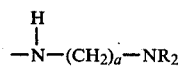

in which R is an alkyl group of 1 to 8 carbon atoms and a is an integer of 2 to 8 and wherein X' is the same as X for homopolymers and for copolymers X' is selected from the group consisting of substituted and unsubstituted alkoxy, aryloxy, amino or mercapto groups.

The polymers of the invention can be utilized to form protective films and may also be utilized in applications such as moldings, coatings and the like.

12 Claims, No Drawings

POLYPHOSPHAZENE POLYMERS CONTAINING DIALKYL ALKYLENE DIAMINO SUBSTITUENTS

BACKGROUND OF THE INVENTION

This invention relates to polyphosphazene homopolymers containing repeating

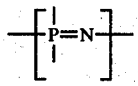

units in the polymer chain in which dialkyl alkylene diamino substituents are attached to the phosphorus atom and to polyphosphazene copolymers containing a dialkyl alkylene diamino substituent and a substituted or unsubstituted alkoxy, aryloxy, amino or mercapto substituent. More particularly, the invention relates to polyphosphazene homopolymers containing substituents derived from dialkyl alkylene diamines and to copolymers derived from dialkyl alkylene diamines and substituted or unsubstituted aliphatic or aromatic alcohols, amines or mercaptans.

Polyphosphazene homo- and co- polymers containing repeating

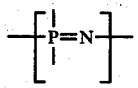

units in which various substituted or unsubstituted, saturated or unsaturated, alkoxy, aryloxy, amino or mercapto groups are attached to the phosphorus atom and their method of preparation are described in the prior art as illustrated in the publication "Phosphorus-Nitrogen Compounds", Academic Press, New York, New York 1972 by H. R. Allcock and "Poly(Organophosphazenes)", Chemtech, Sept. 19, 1975 by H. R. Allcock and in such U.S. Patents as Nos. 3,515,688; 3,702,833; 3,856,712; 3,974,242 and 4,042,561. When poly(dichlorophosphazene) is reacted with a phenylene diamine the poly(dichlorophosphazene) is crosslinked to an insoluble product, H. R. Allcock, W. J. Cook and D. P. Mack, *Inorganic Chemistry*, Vol. 11, 2584 (1972).

None of the aforementioned publications and patents or for that matter, none of the prior art of which applicants are aware, discloses or suggests polyphosphazene homopolymers and copolymers containing dialkyl alkylene diamino substituents attached to the phosphorus from or methods of preparing such polymers and copolymers.

SUMMARY OF THE INVENTION

In accordance with this invention, novel polyphosphazene homopolymers containing dialkyl alkylene diamino substituents and polyphosphazene copolymers containing dialkyl alkylene diamino as well as substituted or unsubstituted alkoxy, aryloxy, amino or mercapto substituents are prepared. The homopolymers contain repeating units represented by the formula:

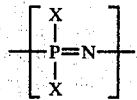

wherein X is

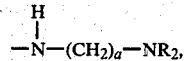

in which R is an alkyl radical containing 1 to 8 carbon atoms, a is an integer of 2 to 8, and the polymer can contain from 20 to 50,000 of such units.

The copolymers of the invention contain units represented by the formulas:

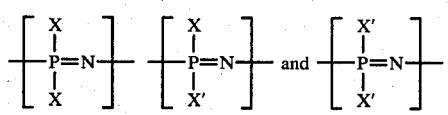

wherein X is

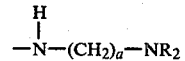

in which R and a are as defined above and X' is selected from the group consisting of substituted or unsubstituted alkoxy, aryloxy, amino or mercapto radicals.

The homopolymers are prepared by reacting a poly(-dichlorophosphazene) having the formula —(NPCl$_2$)$_n$— in which n is from 20 to 50,000 with a dialkyl alkylene diamine in the presence of a tertiary amine.

The homopolymers of the invention can be used to prepare films and may be utilized in applications such as molding, coatings, and the like.

The copolymers are prepared by reacting the poly(dichlorophosphazene) with a mixture of the dialkyl alkylene diamine and a substituted or unsubstituted aliphatic or aromatic alcohol, amino compound or mercaptan compound in the presence of a tertiary amine.

In the copolymer units represented by the above formulas, all X substituent groups may be the same or they may be mixed and all X' substituent groups may be the same or mixed. In the mixtures, the X substituent groups may be mixtures of different dialkyl alkylene diamino groups and the X' substituent groups may be mixtures of different alkoxy, aryloxy, amino and mercaptan groups or mixtures within each class.

The specific proportion of X to X' substituent groups incorporated in the copolymers of the invention may vary considerably depending upon chemical and physical properties desired in the copolymer and the particular end use application for which the copolymer is intended. Thus, for applications such as moldings, coatings, foams and the like, the copolymers should contain at least ten (10) percent by weight of the X substituent.

DETAILED DESCRIPTION OF THE INVENTION

The term "polymer" as used hereinafter throughout this specification and claims is employed in the broad sense and includes homopolymers, copolymers, terpolymers, tetrapolymers and the like.

As indicated heretofore, the polyphosphazenes of this invention are prepared by reacting a poly(dichlorophosphazene) polymer with a dialkyl alkylene diamine or a mixture of a dialkyl alkylene diamine and a compound capable of producing desired optional substituents.

Poly(dichlorophosphazene) polymers which are employed as starting materials in preparing the polymers of this invention are well known in the art as illustrated in U.S. Pat. Nos. 3,370,020; 4,005,171; and 4,055,520 and the aforementioned publications of H. R. Allcock, the disclosures of which are incorporated herein by reference.

These polymers have the general formula —(NPCl$_2$)$_n$—, in which n may range from 20 to 50,000 or more. As described in the aforementioned references, the polymers are general prepared by the thermal polymerization of cyclic oligomers having the formula —(NPCl$_2$)$_n$—, in which n is an integer of from 3 to 7, with the cyclic trimer and tetramer often comprising up to 90% of the oligomers.

The specific conditions of temperature, pressure and time employed in the thermal polymerization of the cyclic oligomers can vary considerably depending on whether or not the polymerization is catalyzed. Thus, temperatures may range from about 130° C. pressures may range from a vacuum of less than about 10$^{-1}$ Torr to superatmospheric and times may range from 30 minutes to about 48 hours.

A preferred process for preparing the poly(dichlorophosphazene) polymers used in the process of this invention is described in the aforementioned incorporated U.S. Pat. No. 4,005,171.

The dialkyl alkylene diamines which may be employed in forming the dialkyl alkylene diamino substituents of the polymers of the invention are those of the formula H$_2$N—(CH$_2$)$_a$—NR$_2$ wherein R is an alkyl group of 1 to 8 carbon atoms and a is an integer of 1 to 8. Representative suitable compounds of this type include N,N-diethyl propylene diamine, N,N-diethyl ethylene diamine, N,N-dimethyl ethylene diamine, N,N-dimethyl propylene diamine and N,N-dimethyl hexamethylene diamine and the like.

Preferred dialkyl alkylene diamines for use in forming the X substituent group are N,N-diethyl propylene diamine and N,N-dimethyl propylene diamine.

As indicated, the X' substituent group may be a substituted or unsubstituted alkoxy, aryloxy, amino or mercapto group.

The alkoxy groups (substituted or unsubstituted) may be derived from aliphatic alcohols having from 1 to 20 carbon atoms such as methanol, ethanol, propanol, isopropanol, n-butanol, sec-butanol, hexane, dodecanol and the like; fluoroalcohols, especially those represented by the formula Z(CF$_2$)$_n$CH$_2$OH in which Z is hydrogen or fluorine and n is an integer from 1 to 10 as illustrated by trifluoroethanol, 2,2,3,3,3-pentafluoropropanol, 2,2,3,3,4,4,4-heptafluorobutanol; 2,2,3,3-tetrafluoro-propanol, 2,2,3,3,4,4,5,5-octafluoropentanol, 2,2,3,3,4,4,5,5,6,6,7,7-dodecafluoroheptanol and the like. In instances where it is desired to incorporate mixed X' substituent groups in the copolymers, mixtures of the foregoing alcohols may be employed.

The aryloxy groups (substituted or unsubstituted) may be derived from aromatic alcohols including among others phenol; alkylphenols such as cresols, xylenols, p-, o-, and m- ethyl and propyl phenols and the like; halogen-substituted phenols such as p-, o-, and m- chloro and bromo phenols and di- or tri-halogen substituted phenols and the like; and alkoxy-substituted phenols such as 4-methoxyphenol, 4-(n-butoxy)phenol and the like. Mixtures of the foregoing aromatic alcohols may also be employed.

The amino groups may be derived from any of the amino compounds heretofore employed in the polyphosphazene polymer art. Thus, the amino groups may be derived from aliphatic primary and secondary amines such as methylamine, ethylamine, dimethylamine, ethylmethylamine and the like are aromatic amines such as those described in U.S. Pat. No. 4,042,561 as illustrated by aniline, halogen-substituted anilines, alkyl-substituted anilines, alkoxy-substituted anilines and the like.

The mercapto groups may be derived from any of the mercaptan compounds heretofore employed in the polyphosphazene polymer art. Thus, for example, the mercaptan compounds described in U.S. Pat. No. 3,974,242 to Lanier at al may be utilized. Representative of suitable mercaptan compounds as described in the aforementioned patent are methyl mercaptan and its homologs ethyl, propyl, butyl, aryl and hexyl mercaptans, thiophenol, thionaphthols, benzyl mercaptan, cyclohexyl mercaptan and the like.

Particularly preferred substituent groups represented by X' for use in these polymers are substituted or unsubstituted alkoxy and aryloxy groups.

The use of a tertiary amine in preparing the polymers of the invention is a very important feature. Thus, the use of the tertiary amine minimizes undesirable side reactions and at the same time acts as an effective acid scavenger.

Tertiary amines which may be employed in preparing the polymers of the invention are those represented by the general structure:

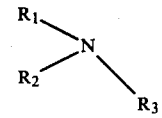

wherein R$_1$, R$_2$, and R$_3$ may each be alkyl containing from 1 to 8 carbon atoms. Thus, for example, the tertiary amine may be a trialkyl amine such as trimethylamine, triethylamine, tri-isopropylamine, tri-n-propylamine, tri-isobutylamine, tri-n-butylamine, and the like. In addition, tertiary amines such as pyridine, N,N,N',N'-tetramethylethylene diamine (TMEDA), dipipyridyl ethane, 1,4 diaza bicyclo (2.2.2) octane (DABCO), N-methyl pyrolle and N-methyl morpholine can also be utilized.

The preferred tertiary amines for use in preparing the polymers of the invention are triethylamine, N,N,N',N'-tetramethylethylene diamine and pyridine.

As indicated above, the polymers of the present invention are prepared by reacting the poly(dichlorophosphazene) polymer and a dialkyl alkylene diamine or a mixture of such dialkyl alkylene diamine with a substituted or unsubstituted aliphatic or aromatic alcohol, amino compound or mercaptan in the presence of a tertiary amine.

The specific reaction conditions and proportion of ingredients employed in preparing these polymers can vary somewhat depending on factors such as the reactivity of the specific compounds utilized, the particular tertiary amine employed, and the degree of substitution desired in the finished polymer. In general, reaction temperatures may range from about 25° C. to about 200° C. and times may range from 3 hours up to 7 days; lower temperatures necessitating longer reaction times and higher temperatures allowing shorter reaction times. These conditions are, of course, utilized in order to obtain the most complete reaction possible, i.e. in order to insure substantially complete conversion of the chlorine atoms in the polymer to the corresponding esters of the reactant compounds.

The above reaction is ordinarily carried out in the presence of a solvent. The solvent employed in the reaction should be a solvent for the poly(dichlorophosphazene) polymer, the dialkyl alkylene diamine reactant, other desired reactants and the tertiary amine. Examples of suitable solvents which may be employed include diglyme, triglyme, tetraglyme, toluene, xylene, cyclohexane, chloroform, dioxane, dioxalene, methylene chloride, tetrachloroethane, and tetrahydrofuran. The amount of solvent employed is not critical and any amount sufficient to solubilize the reaction mixture materials can be employed.

In addition, the materials in the reaction zone should be reasonably free of water. Preferably, the reaction mixture should contain less than about 0.01% by weight of water. The prevention of water in the reaction system is necessary in order to inhibit the reaction of the available chlorine atoms in the chloropolymer therewith.

In general, the amount of the dialkyl alkylene diamine compounds or mixture of such diamine compounds and other reactant compounds employed in the process should be at least molecularly equivalent to the number of available chlorine atoms in the polymer mixture. However, it is preferred that an excess of such compounds be employed in order to insure substantially complete reaction of all the available chlorine atoms.

Where the presence of crosslinking functionality is desired, in a polymer otherwise free of unsaturated crosslinking functionality, crosslinking functionality can be introduced in the polymer molecule through the use of ethylenically unsaturated substituent groups in addition to the groups X and X' set forth above. Examples of suitable crosslinking moieties and methods for their cure are set forth in U.S. Pat. Nos. 3,702,833; 3,844,983; 3,888,799; 4,055,520; and 4,061,606 which are hereby incorporated by reference and include unsaturated monovalent radicals such as $-OCH=CH_2$; $ORCH=CH_2$;

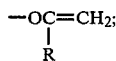

$-ORCF=CF_2$; $-OCH_2RF=CF_2$ and $OR^1R^2$ in which R is an aliphatic or aromatic radical, $R^1$ is alkylene or arylene and $R^2$ is vinyl, allyl, crotyl or the like. Generally, when present, the moieties containing crosslinking functionality are usefully present in an amount between 0.1 mole % to about 50 mole % and usually between 0.5 mole % and about 10 mole % based on the replaceable chlorine in the starting poly(dichlorophosphazene).

The following examples are submitted for the purpose of further illustrating the nature of the present invention and are not intended as a limitation on the scope thereof. Parts and percentages referred to in the examples are by weight unless otherwise indicated.

EXAMPLE 1

Preparation of $[((C_2H_5)_2N(CH_2)_3NH)_2PN]$ Polymer

To a dry nitrogen purged 28 ounce bottle were added 250 cc of tetrahydrofuran (hereinafter "THF") dried to less than 25 ppm water, 22.5 cc (210.4 millimoles) of N,N-diethyl propylene diamine (dried over calcium hydride), 19.8 cc of dry pyridine, and after cooling to 10° to 15° C., 120 gms. of a 7.94% solution of poly(dichlorophosphazene) of a degree of polymerization of about 2600. A rapid reaction was evident. The bottle was heated at 50°C. in a rotary bath for 68 hours. At the end of this time the solution was examined by infrared; the spectrum indicated presence of pyridine hydrochlorine but there were no bands attributable to P-Cl indicating good conversion.

The solid layer was isolated by decanting and washing with methanol. The resulting 16.6 gms. (66.6%) of polymer had a Tg of $-58.5°$ C. and a peak melting temperature $(T_m)$ of 145° C. Heating of the polymer at 300° F. in a forced air over for 10 days resulted in a weight loss of only 15.2%. Boiling 3 gms. of the polymer in 100 cc of water for 10 days resulted in a clear solution having a pH of 7.0. Analysis showed 15.2% chlorine indicating incomplete removal of pyridine hydrochloride.

EXAMPLE 2

Preparation of $[((C_2H_5)_2N(CH_3)_3NH)(CF_3CH_2O)PN]$ Polymer

To a 10 ounce beverage bottle were added 100 cc of dry THF, 6.02 cc (44 millimoles) of N,N-diethylpropylene diamine, 3.2 cc (44 millimoles) of dry trifluoroethanol, 12.3 cc (88 millimoles) of dry triethylamine, and 52.3 (4.62 gms., 39.8 millimoles) of a 8.83% solution of poly(dichlorophosphazene) of a degree of polymerization of 2600 in THF. The solution rapidly became opaque. After heating 68 hours at 80° C. the infrared spectrum of the resulting solution was obtained. There was no evidence of soluble phosphazene; the only bands were those attributable to triethylamine and triethylamine hydrochloride. Washing the salt layer with methanol gave 9.2 gms. (a yield of 84.6%) of copolymer with a Tg of $-34°$ C. and a $T_m$ of 155° C.

An analysis of the polymer product showed the following results:

|  | C | H | N | P | Cl |
|---|---|---|---|---|---|
| Calculated* (%) | 41.16 | 7.89 | 16.33 | 12.46 | 5.50 |
| Actual (%) | 41.16 | 7.89 | 16.32 | 12.46 | 5.50 |

*Calculation based on a copolymer composition of 51.19 weight percent diethyl propylene diamine, and 32.24 weight percent trifluoroethanol with 3.83 weight percent of the poly(dichlorophosphazene) unreacted, 12.25% triethylamine hydrochloride and 5.36% hydrolysis of the chloropolymer.

EXAMPLE 3

This was prepared similar to Example 2 except for use of 12.04 cc (88 millimoles) of N,N-diethyl propylene diamine 18.4 cc (132 millimoles) of triethylamine, 3.2 cc (44 millimoles) of trifluoroethanol, and 13.7 gms. of a 33.9% cyclohexane solution of $(Cl PN)_x$ (44 millimoles of phosphazene) of a degree of polymerization of 1200. Reaction time was 20 hours at 120° C. The 3.2 cc (44 millimoles) of trifluoroethanol was added and heated to 120° C. for 4 additional hours. The I.R. showed no soluble phosphazene polymer. Methanol washing of the salt followed by vacuum drying at 80° C. gave 10.2 gms. of a rubbery, clear, yellow film.

EXAMPLE 4

Preparation of [((CH$_3$)$_2$N(CH$_2$)$_3$NH)(p-ClC$_6$H$_4$O)PN] Polymer

To a 10 oz. bottle was added 100 cc of THF, 5.35 cc (44 millimoles) of N,N-dimethyl propylene diamine, 4.43 cc (44 millimoles) of p-chlorophenol, 12.3 cc (88 millimoles) of triethylamine and 35.1 grams (39.4 millimoles) of a 13.0% solution of poly(dichlorophosphazene) of a degree of polymerization of about 2600 in cyclohexane. The bottle was heated at 120° C. for 20 hours. At the end of this time, the solution was examined by infrared and showed no P-Cl bands at 600 cm$^{-1}$ indicating good conversion. The polymer product was isolated by coagulation with methanol. This procedure yielded 8.50 grams of a tan leathery polymer.

We claim:

1. A polyphosphazene polymer containing units represented by the formulas:

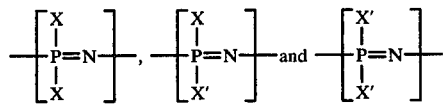

wherein X is

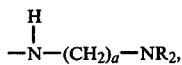

wherein R is an alkyl group of 1 to 8 carbon atoms and a is an integer of 2 to 8, and wherein X' is the same as X or is selected from the group consisting of substituted or unsubstituted alkoxy, aryloxy, amino and mercapto radicals, and wherein said polymer contains from 20 to 50,000 of said units.

2. The polymer of claim 1 wherein X is (C$_2$H$_5$)$_2$N—(CH$_2$)$_3$—NH—.

3. The polymer of claim 1 wherein X and X' are (C$_2$H$_5$)$_2$N—(CH$_2$)$_3$—NH—.

4. The polymer of claim 1 wherein X is (C$_2$H$_5$)$_2$N—(CH$_2$)$_3$—NH— and X' is CF$_3$CH$_2$O—.

5. The polymer of claim 1 wherein X is (CH$_3$)$_2$N—(CH$_2$)$_3$—NH— and X' is p—ClC$_6$H$_5$O—.

6. A method of preparing polyphosphazene polymers containing units represented by the formulas:

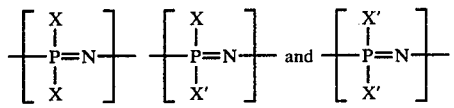

wherein X is a dialkyl alkylene diamino substituent having the formula —NH—(CH$_2$)$_a$—NR$_2$, in which R is an alkyl group of 1 to 8 carbons and a is an integer from 2 to 8, and wherein X' is the same as X or is selected from the group consisting of substituted or unsubstituted alkoxy, aryloxy, amino or mercapto groups; said method comprising reacting a poly(dichlorophosphazene) polymer having the formula —(NPCl$_2$)$_n$—, wherein n is from 20 to 50,000 with a dialkyl alkylene diamine or a mixture consisting of a dialkyl alkylene diamine and a substituted or unsubstituted aliphatic or aromatic alcohol, amino compound or mercaptan in the presence of a tertiary amine.

7. The method of claim 6 wherein said dialkyl alkylene diamine is N,N-diethyl propylene diamine.

8. The method of claim 6 wherein said mixture is a mixture of a dialkyl alkylene diamine and a substituted aliphatic alcohol.

9. The method of claim 8 wherein said dialkyl alkylene diamine is N,N-diethyl propylene diamine and said substituted aliphatic alcohol is trifluoroethanol.

10. The method of claim 6 wherein said mixture is a mixture of a dialkyl alkylene diamine and a substituted aromatic alcohol.

11. The method of claim 10 wherein said dialkyl alkylene diamine is N,N-dimethyl propylene diamine and said substituted aromatic alcohol is p-chlorophenol.

12. The method of claim 6 wherein said tertiary amine is pyridine or triethylamine.

* * * * *

UNITED STATES PATENT AND TRADEMARK OFFICE
CERTIFICATE OF CORRECTION

PATENT NO. : 4,225,697
DATED : September 30, 1980
INVENTOR(S) : William L. Hergenrother and Adel F. Halasa It is certified that error appears in the above-identified patent and that said Letters Patent are hereby corrected as shown below:

Column 1, line 57 delete "from" and insert -- atom --

Column 4, line 11 delete "are" and insert -- and --

Column 4, line 20 delete "at al" and insert -- et al --

Signed and Sealed this

Third Day of March 1981

[SEAL]

Attest:

RENE D. TEGTMEYER

Attesting Officer    Acting Commissioner of Patents and Trademarks